US012772074B2

(12) United States Patent
Wang et al.

(10) Patent No.: US 12,772,074 B2
(45) Date of Patent: Oct. 20, 2026

(54) DATA TRANSMISSION METHOD BY PRE-CONFIGURED RESOURCE, TERMINAL DEVICE, AND NON-TRANSITORY COMPUTER-READABLE STORAGE MEDIUM

(71) Applicant: GUANGDONG OPPO MOBILE TELECOMMUNICATIONS CORP., LTD., Dongguan (CN)

(72) Inventors: Shukun Wang, Dongguan (CN); Cong Shi, Dongguan (CN); Xue Lin, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 499 days.

(21) Appl. No.: 17/935,926

(22) Filed: Sep. 27, 2022

(65) Prior Publication Data

US 2023/0020533 A1 Jan. 19, 2023

Related U.S. Application Data

(63) Continuation of application No. PCT/CN2020/083788, filed on Apr. 8, 2020.

(51) Int. Cl.
*H04W 24/02* (2009.01)
*H04W 12/04* (2021.01)
(Continued)

(52) U.S. Cl.
CPC .......... *H04W 24/02* (2013.01); *H04W 12/04* (2013.01); *H04W 12/108* (2021.01);
(Continued)

(58) Field of Classification Search
CPC ... H04W 24/02; H04W 12/04; H04W 12/108; H04W 36/0085; H04W 72/23;
(Continued)

(56) References Cited

U.S. PATENT DOCUMENTS

2020/0107396 A1 4/2020 Wang et al.
2021/0136855 A1* 5/2021 Shih .................... H04W 74/006
(Continued)

FOREIGN PATENT DOCUMENTS

CN 103428682 12/2013
CN 109391985 2/2019
(Continued)

OTHER PUBLICATIONS

EPO, Extended European Search Report for EP Application No. 20930033.4, May 8, 2023.
(Continued)

*Primary Examiner* — Ayman A Abaza
(74) *Attorney, Agent, or Firm* — Hodgson Russ LLP

(57) ABSTRACT

Embodiments of the present application provide a data transmission method, a terminal device, and a non-transitory computer-readable storage medium. The method includes: receiving, by a terminal device, first configuration information, sent by a network device, and the first configuration is configured to determine configuration information of pre-configured resource, and in response to the pre-configured resource being activated, transmitting uplink data or receiving downlink data via the pre-configured resource by the terminal device. The terminal device includes a memory and a processor. The memory is configured to store a computer program, and the processor is configured to call and run the computer program stored in the memory to execute the above-mentioned data transmission method.

20 Claims, 2 Drawing Sheets

(51) Int. Cl.

| | |
|---|---|
| ***H04W 12/108*** | (2021.01) |
| ***H04W 36/00*** | (2009.01) |
| ***H04W 72/23*** | (2023.01) |
| *H04W 74/0833* | (2024.01) |

(52) U.S. Cl.

CPC ....... *H04W 36/0085* (2018.08); *H04W 72/23* (2023.01); *H04W 74/0833* (2013.01)

(58) Field of Classification Search

CPC ............. H04W 74/0833; H04W 48/20; H04W 72/115; H04W 76/27; H04W 76/30; H04L 5/0023; H04L 5/0033; H04L 5/0098; H04L 5/0053; H04L 5/0064; H04L 5/0094

USPC ........................................................... 370/203

See application file for complete search history.

(56) References Cited

U.S. PATENT DOCUMENTS

| | | | | |
|---|---|---|---|---|
| 2021/0219297 | A1* | 7/2021 | Mi | H04W 74/006 |
| 2021/0337602 | A1* | 10/2021 | Liu | H04W 74/002 |
| 2022/0225465 | A1* | 7/2022 | Xu | H04W 76/34 |
| 2022/0264392 | A1* | 8/2022 | Chen | H04L 5/0051 |
| 2023/0007472 | A1* | 1/2023 | Li | H04W 76/27 |
| 2023/0030443 | A1* | 2/2023 | Chen | H04W 74/0833 |

FOREIGN PATENT DOCUMENTS

| | | |
|---|---|---|
| CN | 109699084 | 4/2019 |
| CN | 110831197 | 2/2020 |
| CN | 110944355 | 3/2020 |
| CN | 2021203310 | 10/2021 |
| EP | 3849271 | 7/2021 |
| WO | 2019041099 | 3/2019 |
| WO | 2020032659 | 2/2020 |
| WO | 2020062058 | 4/2020 |
| WO | 2020065619 | 4/2020 |
| WO | 2020065620 | 4/2020 |
| WO | 2020069103 | 4/2020 |

OTHER PUBLICATIONS

ZTE Corporation, “Summary of small data enhancements for NR Rel-17—Phase 2,” 3GPP TSG-RAN Meeting #86, RP-192574, Dec. 2019.

WIPO, International Search Report and Written Opinion for PCT/CN2020/083788, Dec. 30, 2020.

CNIPA, First Office Action for CN Application No. 202211598869.1, Jun. 15, 2024.

CNIPA, Second Office Action for CN Application No. 202211598869.1, Oct. 23, 2024.

* cited by examiner

DATA TRANSMISSION METHOD BY PRE-CONFIGURED RESOURCE, TERMINAL DEVICE, AND NON-TRANSITORY COMPUTER-READABLE STORAGE MEDIUM

CROSS-REFERENCE TO RELATED APPLICATIONS

The present application is a continuation-application of International Patent Application No. PCT/CN2020/083788, filed Apr. 8, 2020, the entire disclosure of which is incorporated herein by reference.

TECHNICAL FIELD

The present disclosure relates to the field of mobile communication technologies, and in particular to a data transmission method, a terminal device, and a non-transitory computer-readable storage medium.

BACKGROUND

If data is transmitted or received by an inactive terminal device, it is necessary to resume a radio resource control (RRC) connection and enter a connected state before the terminal device may transmit or receive data. In order to realize the inactive terminal device to transmit data or receive data, in New Radio (NR), the pre-configuration of uplink (UL) resource and downlink (DL) resource is supported by means of RRC signaling, such that transmission and reception of data may be performed respectively by the terminal device. However, the resource pre-configured by the RRC signaling (referred to as pre-configured resource) are always reserved for the terminal device once configured. However, it is not necessary for the terminal device to transmit or receive data all the time, resulting in causing waste of resources.

SUMMARY OF THE DISCLOSURE

The present disclosure provides a data transmission method, a terminal device, and a non-transitory computer-readable storage medium.

According to a first aspect, the present disclosure provides a data transmission method, including:

receiving, by a terminal device, first configuration information, sent by a network device, and the first configuration information is configured to determine configuration information of pre-configured resource; and in response to the pre-configured resource being activated, transmitting uplink data or receiving downlink data via the pre-configured resource by the terminal device.

According to a second aspect, the present disclosure provides a terminal device, including: a memory and a processor. The memory is configured to store a computer program, and the processor is configured to call and run the computer program stored in the memory to execute the data transmission method as described in the first aspect of the present disclosure.

According to a third aspect, the present disclosure provides a non-transitory computer-readable storage medium, configured to store a computer program. The computer program is capable of causing a computer to execute the data transmission method as described in the first aspect of the present disclosure.

BRIEF DESCRIPTION OF THE DRAWINGS

The drawings described herein are intended to provide further understanding of the present disclosure and constitute a part of the present disclosure. The schematic embodiments and descriptions of the present disclosure are intended to illustrate the present disclosure, and do not contribute to any improper limitations of the present disclosure.

DETAILED DESCRIPTION

Figure 1:
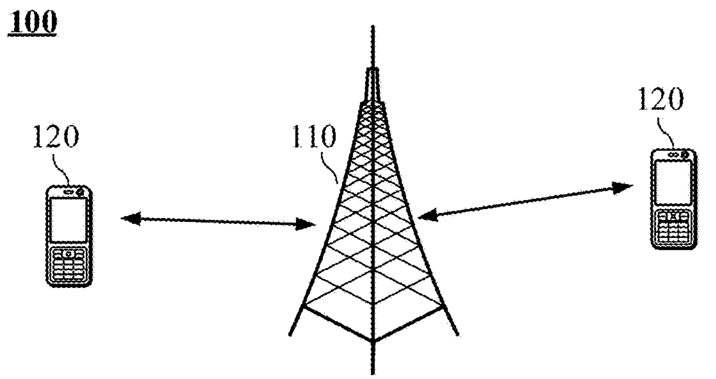
FIG. 1 is a schematic view of a communication system architecture according to some embodiments of the present disclosure.

The technical solutions in the embodiments of the present disclosure will be described below in conjunction with the accompanying drawings in the embodiments of the present disclosure. Obviously, the embodiments described are a part of the embodiments of the present disclosure, and not all of them. With respect to the embodiments in the present disclosure, all other embodiments obtained by those skilled in the art without making creative labor fall within the scope of the present disclosure.

According to a first aspect of the present disclosure, a data transmission method includes: receiving, by a terminal device, first configuration information, sent by a network device, and the first configuration information is configured to determine configuration information of pre-configured resource; and in response to the pre-configured resource being activated, transmitting uplink data or receiving downlink data via the pre-configured resource by the terminal device.

In some embodiments, the first configuration information and suspend configuration are carried in radio resource control (RRC) releasing message. Alternatively, the first configuration information is carried in the suspend configuration, and the suspend configuration is carried in the RRC releasing message. The suspend configuration is configured to determine an RRC inactive configuration parameter.

In some embodiments, the first configuration information includes at least one of: first indication information, configured to indicate whether an initial state of the pre-configured resource is an activated state or a deactivated state; second indication information, configured to indicate a duration of a first timer, the first timer is configured to trigger deactivation of the pre-configured resource; third indication information, configured to indicate a maximum value of a first counter, and the first counter is configured to trigger deactivation of the pre-configured resource; and resource configuration of the pre-configured resource.

In some embodiments, the resource configuration of the pre-configured resource includes at least one of: period, interval, time domain resource, frequency domain resource, a modulation and demodulation parameter, and a transport block size (TBS) parameter.

In some embodiments, in response to the pre-configured resource being uplink pre-configured resource, the method further includes: in response to the terminal device determining that small data needs to be transmitted, selecting random access resource corresponding to the small data to initiate random access process, and sending an RRC resume request message, configured to apply for activating the pre-configured resource, to the network device; and receiving, by terminal device, an RRC release message sent by the network device, and performing integrity protection verification for the RRC release message. In response to the verification passing, the pre-configured resource is activated by the terminal device. In response to the verification failing, the terminal device enters an idle state, and context of the terminal device is released by the terminal device.

In some embodiments, in response to the pre-configured resource being downlink pre-configured resource, the method further includes: receiving, by the terminal device, a paging message sent by the network device, the paging message carries fifth indication information, and the fifth indication information is configured to indicate the terminal device to at least one of activating the pre-configured resource, and preparing to receive the small data through the pre-configured resource; in response to the terminal device determining that small data needs to be transmitted, selecting random access resource to initiate random access process, and sending an RRC resume request message, configured to apply for activating the pre-configured resource, to the network device; and receiving, by the terminal device, the RRC release message sent by the network device, and performing integrity protection verification for the RRC release message. In response to the verification passing, the pre-configured resource is activated by the terminal device. In response to the verification failing, the terminal device enters an idle state, and context of the terminal device is released by the terminal device.

In some embodiments, the method further includes: after the pre-configured resource being activated by the terminal device, in response to a first timer or a first counter being configured, starting the first timer or resetting the first counter.

In some embodiments, the selecting random access resource to initiate random access process further includes: selecting a preamble corresponding to at least one of the small data and a random access channel (RACH) resource to initiate the random access process.

In some embodiments, after receiving the RRC resume request message, the network device obtains the context of the terminal device and determines that purpose of the terminal device sending the RRC resume request message is to activate the pre-configured resource for the small data transmission and reception according to at least one of: determining that the small data transmission is performed by the terminal device according to the random access resource, and determining that the purpose of the RRC resume request message is to activate the pre-configured resource for the small data transmission according to a case that the transmission channel corresponding to the RRC resume request message and the transmission channel corresponding to the small data are not multiplexed to transmit in the MAC layer; and determining that the purpose of the RRC resume request message is to activate the pre-configured resource for the small data transmission according to a case that the pre-configured resource is included in the context of the terminal device.

In some embodiments, the RRC resume request message carries fourth indication information. The transmission channel corresponding to the RRC resume request message and the fourth indication information are multiplexed in a media access control control element (MAC CE).

In some embodiments, the RRC release message is encrypted and integrity protected via a first secret key by the network device, the first secret key is a secret key updated based on a first NCC, and the first NCC has been configured to the terminal device before the network device sends the RRC release message. The RRC release message carries a second NCC, and the second NCC is a new NCC requested by the network device from a core network for the terminal device.

In some embodiments, the method further includes: after the terminal device activating the pre-configured resource and resetting the first counter, adding a value of the first counter by 1 every the pre-configured resource being used; and in response to the value of the first counter being greater or equal to the maximum value of the first counter, deactivating the pre-configured resource by the terminal device.

In some embodiments, in response to the terminal device entering the inactive state, the pre-configured resource being automatically released if at least one of following events taking place on the terminal device: cell reselection taking place on the terminal device; inter-RAT cell reselection taking place on the terminal device; a variation of the path loss value of the terminal device exceeding a certain threshold; a difference between the path loss value of the terminal device and the configuration value exceeding a certain threshold; a variation of reference signal receiving power (RSR) of a measured cell of the terminal device exceeding a certain threshold; a difference between variation of the RSR of the measured cell of the terminal device and the configuration value exceeding a certain threshold; a mobile speed of the terminal device exceeding a certain threshold; a mobile state of the terminal device exceeding a certain threshold; the terminal device moving out of a first area range, and the first area range being an effective area range of the pre-configured resource; and the terminal device entering the connected state.

According to a second aspect, a terminal device includes a memory and a processor. The memory is configured to store a computer program, and the processor is configured to call and run the computer program stored in the memory to execute a data transmission method. The data transmission method includes: receiving, by a terminal device, first configuration information, sent by a network device, and the first configuration information is configured to determine configuration information of pre-configured resource; and in response to the pre-configured resource being activated, transmitting uplink data or receiving downlink data via the pre-configured resource by the terminal device.

In some embodiments, the first configuration information and suspend configuration are carried in radio resource control (RRC) releasing message. Alternatively, the first configuration information is carried in the suspend configuration, and the suspend configuration is carried in the RRC releasing message. The suspend configuration is configured to determine an RRC inactive configuration parameter.

In some embodiments, the first configuration information includes at least one of: first indication information, configured to indicate whether an initial state of the pre-configured resource is an activated state or a deactivated state; second indication information, configured to indicate a duration of a first timer, the first timer is configured to trigger deactivation of the pre-configured resource; third indication information, configured to indicate a maximum value of a first counter, and the first counter is configured to trigger deactivation of the pre-configured resource; and resource configuration of the pre-configured resource.

In some embodiments, the resource configuration of the pre-configured resource includes at least one of: period, interval, time domain resource, frequency domain resource, a modulation and demodulation parameter, and a transport block size (TBS) parameter.

In some embodiments, the method further includes: after the pre-configured resource being activated by the terminal device, in response to a first timer or a first counter being configured, starting the first timer or resetting the first counter.

In some embodiments, in response to the terminal device entering the inactive state, the pre-configured resource being automatically released if at least one of following events taking place on the terminal device: cell reselection taking place on the terminal device; inter-RAT cell reselection taking place on the terminal device; a variation of the path loss value of the terminal device exceeding a certain threshold; a difference between the path loss value of the terminal device and the configuration value exceeding a certain threshold; a variation of reference signal receiving power (RSR) of a measured cell of the terminal device exceeding a certain threshold; a difference between variation of the RSR of the measured cell of the terminal device and the configuration value exceeding a certain threshold; a mobile speed of the terminal device exceeding a certain threshold; a mobile state of the terminal device exceeding a certain threshold; the terminal device moving out of a first area range, and the first area range being an effective area range of the pre-configured resource; and the terminal device entering the connected state.

According to a third aspect, a non-transitory computer-readable storage medium is configured to store a computer program. The computer program is capable of causing a computer to execute a data transmission method. The data transmission method includes: receiving, by a terminal device, first configuration information, sent by a network device, and the first configuration is configured to determine configuration information of pre-configured resource; and in response to the pre-configured resource being activated, transmitting uplink data or receiving downlink data via the pre-configured resource by the terminal device.

The embodiments of the present disclosure may be applied to various communication systems, such as long term evolution (LTE) system, LTE frequency division duplex (FDD) system, LTE time division duplex (TDD) system, 5G communication system, communication systems in future, etc.

Exemplarily, a communication system 100 applied in the embodiments of the present disclosure is shown in FIG. 1. The communication system 100 may include a network device 110, and the network device 110 may be a device that communicates with a terminal 120 (or referred to as a communication terminal or terminal) The network device 110 may provide communication coverage for a specific geographic region and may communicate with terminal device located within the coverage region. In some embodiments, the network device 110 may be an evolutional base station (Evolutional Node B, eNB, or eNodeB) in the LTE system, or a wireless controller in cloud radio access network (CRAN). Alternatively, the network device 110 may be a mobile switching center, a relay station, an access point, an in-vehicle device, a wearable device, a hub, a switch, a bridge, a router, a network side device in 5G network, a network device in the future communication systems, etc.

The communication system 100 further includes at least one terminal 120 located within the coverage region of the network device 110. The "terminal" used herein may include, but is not limited to, is connected via wired lines, such as public switched telephone networks (PSTN), digital subscriber line (DSL), digital cable, or direct cable; and/or is connected via wireless interface, such as cellular network, wireless local area network (WLAN), digital television network such as digital video broadcasting handheld (DVB-H) network, satellite network, an automated mapping/facilities management (AM-FM) broadcast transmitter. And/or another terminal is set to an apparatus that receives/sends communication signals. And/or the terminal may be an internet of things (IoT) device. The terminal set to communicate through a wireless interface may be referred to as a wireless communication terminal, a wireless terminal, or a mobile terminal. An example of the mobile terminal includes, but is not limited to, a satellite phone, or a cellular phone. The mobile terminal may be a personal communications system (PCS) terminal that may combine cellular radiotelephony with data processing, facsimile, and data communication capabilities. The mobile terminal may include a Personal Digital Assistant including a radiotelephone, a pager, an Internet/Intranet access, a Web browser, a memo pad, a calendar, and/or a global positioning system (GPS) receiver, and conventional laptop and/or handheld receivers, or other electronic apparatuses including radiotelephone transceivers. The terminal may be referred to an access terminal, user equipment (UE), a user unit, a user station, a mobile station, a mobile platform, a remote station, a remote terminal, a mobile device, a user terminal, a terminal, a wireless communication device, a user agent, a user apparatus, etc. The access terminal may be a cellular telephone, a cordless telephone, a session initiation protocol (SIP) telephone, a wireless local loop (WLL) station, a personal digital assistant (PDA) device, a handheld device with wireless communication capabilities, a computing device or other processing devices connected to a wireless modem, an in-vehicle device, a wearable device, a terminal in 5G network, a terminal in future evolved public land mobile network (PLMN), etc.

In some embodiments, a communication way of device to device (D2D) may be performed between the terminals 120.

In some embodiments, the 5G communication system or the 5G network may be referred to as a new radio (NR) system or NR network.

FIG. 1 exemplarily illustrates one network device and two terminals. In some embodiments, the communication system 100 may include multiple network devices and other numbers of terminal devices may be included within the coverage region of each network device, which are not limited in the embodiments of the present disclosure.

In some embodiments, the communication system 100 may further include other network entities such as a network controller, a mobile management entity, etc., which are not limited in the embodiments of the present disclosure.

It should be understood that devices with communication functions in the network/system in the embodiments of the present disclosure may be referred to as communication devices. Taking the communication system 100 illustrated in FIG. 1 as an example, the communication devices may include the network device 110 and terminal 120 with communication functions, and the network device 110 and terminal 120 may be specific devices as described above, which will not be described herein. The communication devices may further include other devices in the communication system 100, such as a network controller, a mobile management entity, and other network entities, which are not limited in the embodiments of the present disclosure.

It should be understood that the terms "system" and "network" may be used interchangeably in this document. The term "and/or" in this document is only a description of an association relationship of associated objects, indicating that three relationships may exist, for example, A and/or B, which may indicate: the existence of A alone, the existence of both A and B, and the existence of B alone. In addition, the character "/" generally indicates that the front and rear associated objects are in an "or" relationship.

In order to understand the technical solutions in the embodiments of the present disclosure, the technical solutions of the present disclosure are detailed below through specific embodiments.

With people's pursuit of speed, delay, high-speed mobility, energy efficiency, and the diversity and complexity of services in future life, the $3^{rd}$ generation partnership project (3GPP) international standards organization began to develop 5G. The main application scenarios of the 5G may be enhanced mobile broadband (eMBB), ultra-Reliable low-latency communications (URLLC), and massive machine-type communications (mMTC).

On the one hand, the eMBB still aims at users' access to multimedia content, services and data, and the demand of the is eMBB growing rapidly. On the other hand, since the eMBB may be deployed in different scenarios, such as indoor, urban, rural, etc., resulting in a big difference between capabilities and requirements, thus it cannot be generalized, and must be detailed in conjunction with specific deployment scenarios of the eMBB. Typical applications of the URLLC include industrial automation, power automation, telemedicine operation (surgery), traffic safety assurance, etc. Typical characteristics of the mMTC include high connection density, small amount of data, delay insensitive services, low cost and long service life of modules, etc.

RRC State

In order to reduce radio signaling, and quickly restore wireless connections and data services, 5G defines a new RRC state, namely, an RRC_INACTIVE state. The RRC_INACTIVE state is different from an RRC_IDLE state and an RRC_ACTIVE state.

1) The RRC_IDLE state (referred to as idle state for short): mobility is selection and reselection based on a cell where terminal device is located, paging is initiated by core network (CN), and the paging area is configured by the CN. There is no terminal device context and RRC connection on the base station side.

2) The RRC_CONNECTED state (referred to as connected state for short): there is the RRC connection, and there is the terminal device context on the base station side and the mobile terminal side. The location of the terminal device which is at the specific cell level is known by the network side. Mobility is the mobility controlled by the network side. Unicast data may be transmitted between the terminal device and base station.

3) The RRC_INACTIVE state (referred to as inactive state for short): mobility is selection and reselection based on the cell where terminal device is located. There is a connection between the CN and the NR, there is the terminal device context on a base station, and the paging is triggered by radio access network (RAN). Based on the paging area of the RAN managed by the RAN, the location of the terminal device which is based on the paging area level of the RAN is known by the network side.

The above-mentioned three states of the RRC may be converted to each other. The terminal device is in the inactive state, and the terminal device automatically returns to the idle state under the following cases.

An initial paging message of CN is received by the terminal device.

When RRC resume request is initiated by the terminal device, a timer T319 is started if a timer expires.

The terminal device fails to verify the integrity protection of MSG4.

Other radio access technology (RAT) is reselected by the cell of the terminal device.

The terminal device enters to a state, that is, the terminal device camps on any cell.

When the terminal device is in the inactive state, the network side may configure RRC inactive configuration parameters by means of the RRC releasing message to the terminal device. The RRC inactive configuration parameters mainly include following parameters.

Inactive RNTI radio network temporary identity (I-RNTI), which is configured to identify the terminal device inactive context (UE inactive context) on the base station side of the terminal device, which is unique in the base station.

RAN notification area (RNA), which is configured to control an area where the terminal device in the inactive state performs cell selection and reselection, and the area is also the paging range area for the initial paging of the RAN.

RAN paging cycle is configured to calculate paging timing for the initial paging of the RAN.

RNA updating (RNAU) periodicity is configured to control cycle of the terminal device performing periodic RAN position updating.

Next hop chaining counter (NCC) is configured to determine a secret key used during RRC connection resume.

When the terminal device moves within the RNA area, it is not necessary to notify the network side, a mobility behavior is followed in the idle state, i.e., the cell selection reselection principle. When the terminal device moves out the paging area configured by the RAN, the terminal device triggers the RRC connection process (i.e., RRC resume procedure) and reacquires the paging area configured by the RAN. When the network side needs to transmit data to the terminal device, that is, when downlink data arrives, the base station that saves the context of the terminal device (that is, the base station that the terminal device maintains the connection between an access network and a core network) may trigger all cells in the RAN paging area to send paging messages to the terminal device, such that the inactive terminal device may resume the RRC connection and receive data. In addition, the terminal device in the inactive state is configured with the RAN paging area. Thus, in order to ensure an accessibility of the terminal device in the RAN paging area, it is necessary for the terminal device to perform periodic location updating according to the period configured by the network. Scenarios that trigger the terminal device to perform RNA updating include: the RNAU timer expires, or the terminal device moves to an area outside the RNA. Currently, the inactive state defined by the NR does not support the terminal device to transmit user plane data.

When a target base station that the terminal device initiates the RRC connection resume process is not an anchor base station, the anchor base station determines whether it is necessary to transfer the context of the terminal device to the target base station side. Generally, the target base station may send reason value carried in the RRC resume request message sent by the terminal device to the anchor base station during the terminal context request process, and the anchor base station determines whether it is necessary to transfer the context of the terminal device to the target base station side. For example, the RRC connection resume process triggered by the periodic RAN location updating generally does not require context transfer.

By means of the RRC connection resume process, the terminal device may transmit small data through the user plane, that is, it is possible to achieve early data transmission (EDT) or small data transmission. In an embodiment, the small data is transmitted in dedicated transmission channel (DTCH), MSG3 is transmitted in common control channel (CCCH), DTCH and CCCH are multiplexed to transmit in a medium access control (MAC) layer, thereby achieving the uplink transmission of small data. It is similar to the downlink, the small data is transmitted in the DTCH, MSG4 (i.e., an RRC release message) is transmitted in the CCCH, and the DTCH and CCCH are multiplexed to transmit in the MAC layer, thereby achieving the downlink transmission of the small data.

In the NR, the pre-configuration of the uplink resource and downlink resource is supported by means of the RRC signaling, such that transmission and reception of data may be performed respectively by the terminal device. The pre-configured resource is periodically configured transmission resource, such that dynamic scheduling of transmission resource may be reduced, thus it is possible to reduce service data transmission delay, signaling overhead and network side load. However, the resource pre-configured by the RRC signaling (referred to as pre-configured resource) are always reserved for the terminal device once configured. However, it is not necessary for the terminal device to transmit or receive data all the time, resulting in causing waste of resources. Therefore, the following technical solutions in the embodiments of the present disclosure are provided, in order to improve the use efficiency of the pre-configured resource.

Figure 2:
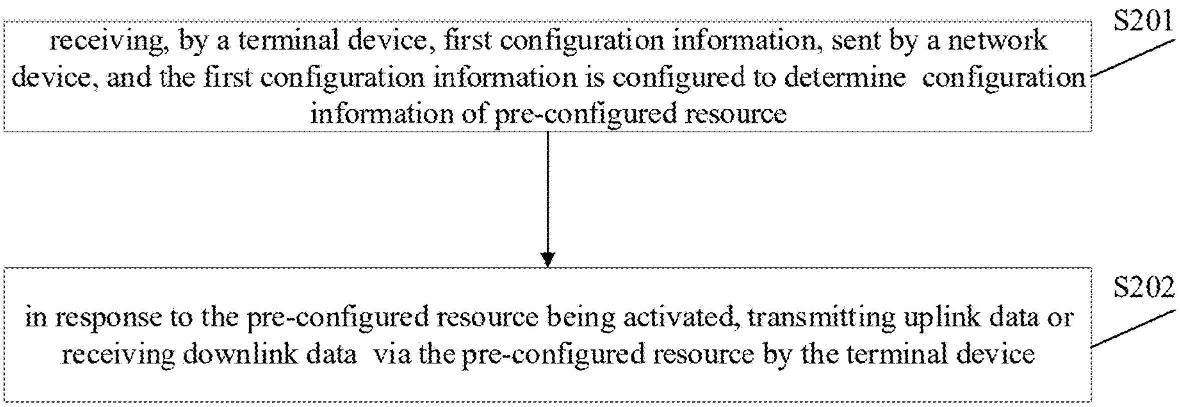
FIG. 2 is a schematic flowchart of a data transmission method according to some embodiments of the present disclosure.

FIG. 2 is a schematic flowchart of a data transmission method according to some embodiments of the present disclosure. As shown in FIG. 2, the data transmission method includes following operations.

In an operation S201, a terminal device receives first configuration information sent by a network device, and the first configuration information is configured to determine configuration information of pre-configured resource.

In the embodiment, the network device may be the base station, such as gNB.

In an embodiment, the first configuration information may be configured by the RRC signaling. That is, the terminal device receives the RRC signaling sent by the network device. The first configuration information is carried by the RRC signaling.

In the embodiment, the first configuration information is configured to determine the configuration information of the pre-configured resource.

In an embodiment, the first configuration information includes one or more the configuration information of uplink pre-configured resource. In another embodiment, the first configuration information includes one or more the configuration information of downlink pre-configured resource. In yet another embodiment, the first configuration information includes one or more the configuration information of uplink pre-configured resource, and one or more the configuration information of downlink pre-configured resource.

It should be noted that the uplink pre-configured resource refers to pre-configured resource configured for uplink transmission. The downlink pre-configured resource refers to pre-configured resource configured for downlink transmission.

In an embodiment, the first configuration information and suspend configuration (suspendconfig) are simultaneously configured, and the suspend configuration is configured to determine an RRC inactive configuration parameter.

In an embodiment, the first configuration information and the suspend configuration are carried in the RRC releasing message. In another embodiment, the first configuration information is carried in the suspend configuration, for example, the first configuration information is carried in the suspend configuration IE, and the suspend configuration is carried in the RRC releasing message.

In the above-mentioned solution, in some embodiments, the first configuration information includes at least one of following information.

First indication information is configured to indicate whether an initial state of the pre-configured resource is an activated state or a deactivated state.

Second indication information is configured to indicate a duration of a first timer, and the first timer is configured to trigger deactivation of the pre-configured resource.

Third indication information is configured to indicate a maximum value of a first counter, and the first counter is configured to trigger deactivation of the pre-configured resource.

Resource configuration of the pre-configured resource.

It should be noted that if the initial state of the pre-configured resource is the deactivated state, it is necessary to activate the pre-configured resource before the pre-configured resource is configured to transmit uplink data or receive downlink data by the terminal device.

In the above-mentioned solution, in some embodiments, the resource configuration of the pre-configured resource includes at least one of: period, interval, time domain resource, frequency domain resource, a modulation and demodulation parameter, and a transport block size (TBS) parameter.

In an operation S202, in response to the pre-configured resource being activated, the uplink data is transmitted or the downlink data is received via the pre-configured resource by the terminal device.

In some embodiments, in response to the pre-configured resource being the uplink pre-configured resource and being activated, the pre-configured resource may be configured to transmit the uplink data. In response to the pre-configured resource being the downlink pre-configured resource and being activated, the pre-configured resource may be configured to transmit the downlink data.

In order to illustrate how to activate the pre-configured resource, embodiments of the present disclosure will be described in detail below in connection with the uplink and downlink cases.

The case of the pre-configured resource is the uplink pre-configured resource.

With respect to this case, the uplink pre-configured resource is activated by means of initiating an RRC resume process by the terminal device. Specifically, the embodiments in the present disclosure include following cases.

Case 1. When the terminal device determines that small data needs to be transmitted, random access resource corresponding to the small data is selected to initiate random access process, and an RRC resume request message is sent to the network device. The RRC resume request message is configured to apply for activating the pre-configured resource.

The terminal device may select the random access resource to initiate the random access process by the following ways. The terminal device selects a preamble corresponding to the small data and/or a random access channel (RACH) resource to initiate a random access process.

It should be noted that a transmission channel corresponding to the RRC resume request message and a transmission channel corresponding to the small data are not multiplexed to transmit in the MAC layer. In some embodiments, the transmission channel corresponding to the RRC resume request message is the CCCH, and the transmission channel corresponding to the small data is the DTCH.

In some embodiments, after receiving the RRC resume request message, the network device may determine that the purpose of the terminal device sending the RRC resume request message is to activate the pre-configured resource for the small data transmission according to at least one of following cases.

Manner 1. After receiving the RRC resume request message, the network device obtains the context of the terminal device and determines that the purpose of the terminal device sending the RRC resume request message is to activate the pre-configured resource for the small data transmission according to at least one of following cases.

It is determined that the small data transmission is performed by the terminal device according to the random access resource, and it is determined that the purpose of the RRC resume request message is to activate the pre-configured resource for the small data transmission according to a case that the transmission channel corresponding to the RRC resume request message and the transmission channel corresponding to the small data are not multiplexed to transmit in the MAC layer.

It is determined that the purpose of the RRC resume request message is to activate the pre-configured resource for the small data transmission according to a case that the pre-configured resource is included in the context of the terminal device.

Manner 2. The RRC resume request message carries fourth indication information. Alternatively, the transmission channel corresponding to the RRC resume request message and the fourth indication information are multiplexed in a media access control control element (MAC CE). The fourth indication information is configured to indicate the terminal device to apply for activating the pre-configured resource. After the RRC resume request message is received by the network device, according to the fourth indication information of the RRC resume request message, the network device determines that the purpose of the terminal device sending the RRC resume request message is to activate the pre-configured resource for the small data transmission.

In some embodiments, the fourth indication information is configured to indicate at least one of following cases.

It is indicated that whether the pre-configured resource applied for activation is the uplink pre-configured resource or the downlink pre-configured resource.

It is indicated that index information of the pre-configured resource applied for activation.

It is indicated that the number of continuous pre-configured resource applied for activation.

Case 2. The terminal device receives the RRC release message sent by the network device, and performs integrity protection verification for the RRC release message.

The RRC release message is encrypted and integrity protected via a first secret key by the network device. The first secret key is a secret key updated based on a first NCC. The first NCC has been configured to the terminal device before the network device sends the RRC release message. Further, the RRC release message carries a second NCC. The second NCC is a new NCC requested by the network device from the core network (such as Access Management Function (AMF)) for the terminal device.

In an embodiment, the RRC release message further carries the number of the pre-configured resource confirmed to be activated by the network device, or duration confirmed to be activated by the network device.

Case 3. In response to the verification passing, the pre-configured resource is activated by the terminal device. In response to the verification failing, the terminal device enters an idle state, and the context of the terminal device is released by the terminal device.

In an embodiment, if a first timer or a first counter is configured, the terminal device starts the first timer or resets the first counter after activating the pre-configured resource.

Furthermore, in an embodiment, after the terminal device activates the pre-configured resource and starts the first timer, if the first timer expires, the terminal device deactivates the pre-configured resource. In some embodiments, duration of the first timer is configured by the network device. Alternatively, the duration of the first timer is configured by the terminal device. For example, the duration of the first timer may be configured by the network device in the MSG4 (such as the RRC release message). Alternatively, the duration of the first timer may be configured by the terminal device in the MSG3 (such as the RRC resume message).

Furthermore, in another embodiment, after the terminal device activates the pre-configured resource and resets the first counter, and a value of the first counter is added by 1 every the pre-configured resource being used. If the value of the first counter is greater or equal to the maximum value of the first counter, the terminal device deactivates the pre-configured resource. In some embodiments, the maximum value of the first counter is configured by the network device or the terminal device. For example, the maximum value of the first counter may be configured by the network device in the MSG4 (such as the RRC release message). Alternatively, the maximum value of the first counter may be configured by the terminal device in the MSG3 (such as the RRC resume message).

In an embodiment, after the terminal device enters the idle state, if the terminal device determines that the small data needs to be transmitted, the terminal device initiates the random access process and transmits the small data after the terminal device enters the connected state.

The case of the pre-configured resource is the downlink pre-configured resource.

With respect to this case, the downlink pre-configured resource is activated by means of paging the terminal device. Specifically, the embodiments in the present disclosure include following cases.

Case 1. The terminal device receives a paging message sent by the network device. The paging message carries fifth indication information. The fifth indication information is configured to indicate the terminal device to activate the pre-configured resource, and/or prepare to receive the small data through the pre-configured resource.

Case 2. When the terminal device determines that the small data needs to be transmitted, the random access resource is selected to initiate the random access process, and the RRC resume request message is sent to the network device. The RRC resume request message is configured to apply for activating the pre-configured resource.

The terminal device may select the random access resource to initiate the random access process by the following ways. The terminal device selects the preamble corresponding to the small data and/or the RACH resource to initiate the random access process.

It should be noted that the transmission channel corresponding to the RRC resume request message and the transmission channel corresponding to the small data are not multiplexed to transmit in the MAC layer. In some embodiments, the transmission channel corresponding to the RRC resume request message is the CCCH, and the transmission channel corresponding to the small data is the DTCH.

In some embodiments, after receiving the RRC resume request message, the network device may determine that the purpose of the terminal device sending the RRC resume request message is to activate the pre-configured resource for the small data reception according to any one of following cases.

Manner 1. After receiving the RRC resume request message, the network device obtains the context of the terminal device and determines that the purpose of the terminal device sending the RRC resume request message is to activate the pre-configured resource for the small data reception according to at least one of following cases.

It is determined that the small data transmission is performed by the terminal device according to the random access resource, and it is determined that the purpose of the RRC resume request message is to activate the pre-configured resource for the small data reception according to a case that the transmission channel corresponding to the RRC resume request message and the transmission channel corresponding to the small data are not multiplexed to transmit in the MAC layer.

It is determined that the purpose of the RRC resume request message is to activate the pre-configured resource for the small data reception according to a case that the pre-configured resource is included in the context of the terminal device.

Manner 2. The RRC resume request message carries the fourth indication information. Alternatively, the transmission channel corresponding to the RRC resume request message and the fourth indication information are multiplexed in the MAC CE. The fourth indication information is configured to indicate the terminal device to apply for activating the pre-configured resource. After the RRC resume request message is received by the network device, according to the fourth indication information of the RRC resume request message, the network device determines that the purpose of the terminal device sending the RRC resume request message is to activate the pre-configured resource for the small data reception.

In some embodiments, the fourth indication information is configured to indicate at least one of following cases.

It is indicated that whether the pre-configured resource applied for activation is the uplink pre-configured resource or the downlink pre-configured resource.

It is indicated that the index information of pre-configured resource applied for activation.

It is indicated that the number of continuous pre-configured resource applied for activation.

Case 3. The terminal device receives the RRC release message sent by the network device, and performs integrity protection verification for the RRC release message.

The RRC release message is encrypted and integrity protected via the first secret key by the network device. The first secret key is a secret key updated based on a first NCC. The first NCC has been configured to the terminal device before the network device sends the RRC release message. Further, the RRC release message carries a second NCC. The second NCC is a new NCC requested by the network device to the core network (such as the AMF) for the terminal device.

In an embodiment, the RRC release message further carries the number of pre-configured resource confirmed to be activated by the network device, or the duration confirmed to be activated by the network device.

Case 4. In response to the verification passing, the pre-configured resource is activated by the terminal device. In response to the verification failing, the terminal device enters an idle state, and the context of the terminal device is released by the terminal device.

In an embodiment, after the pre-configured resource is activated by the terminal device, in response to a first timer or a first counter being configured, the terminal device starts the first timer or resets the first counter.

Furthermore, in an embodiment, after the terminal device activates the pre-configured resource and starts the first timer, in response to the first timer expiring, the terminal device deactivates the pre-configured resource. In some embodiments, duration of the first timer is configured by the network device. Alternatively, the duration of the first timer is configured by the terminal device. For example, the duration of the first timer may be configured by the network device in the MSG4 (such as the RRC release message). Alternatively, the duration of the first timer may be configured by the terminal device in the MSG3 (such as the RRC resume message).

Furthermore, in another embodiment, after the terminal device activates the pre-configured resource and resets the first counter, the pre-configured resource is used once, a value of the first counter is added by 1. In response to the value of the first counter being greater or equal to the maximum value of the first counter, the terminal device deactivates the pre-configured resource. In some embodiments, the maximum value of the first counter is configured by the network device or the terminal device. For example, the maximum value of the first counter may be configured by the network device in the MSG4 (such as the RRC release message). Alternatively, the maximum value of the first counter may be configured by the terminal device in the MSG3 (such as the RRC resume message).

In an embodiment, after entering the idle state, in response to the terminal device determining that the small data needs to be transmitted, the terminal device initiates the random access process and transmits the small data after entering the connected state.

The above technical solutions of the embodiments of the present disclosure is illustrated below in combination with specific examples.

A First Example

For the uplink pre-configured resource, following operations are included.

First, if there is the small data transmission in the terminal device, the uplink pre-configured resource is configured by the network device, and the initial state of the pre-configured resource is the deactivated state, the terminal device selects the preamble corresponding to the small data and/or the RACH resource to initiate the random access process, and sends the RRC resume request message to the base station. In addition, the CCCH corresponding to the RRC resume request message and the small data corresponding to the DTCH are not multiplexed in the MAC layer.

Second, after receiving the RRC resume request message, the base station obtains the context message of the terminal device. According to the preamble corresponding to the RRC resume request message sent by the terminal device, and/or the RACH resource, the small data transmission is determined by the terminal device. Furthermore, the base station judges that the purpose of the terminal device sending the RRC resume request message is to activate the uplink pre-configured resource for the small data transmission according to a case that the CCCH corresponding to the RRC resume request message and the small data corresponding to the DTCH are not multiplexed in the MAC layer, and/or the case that the pre-configured resource is included in the context of the terminal device.

Alternatively, the terminal device carries an indication information (i.e., the fourth indication information) in the RRC resume request message. Alternatively, the indication information and the CCCH corresponding to the RRC resume request message multiplex one MAC CE in the MAC layer (i.e., the indication information is carried by the MAC CE). The indication information is configured to indicate the terminal device to apply for activating the pre-configured resource. In some embodiments, the indication information is configured to indicate at least one of following cases.

It is indicated that whether the pre-configured resource applied for activation is the uplink pre-configured resource or the downlink pre-configured resource.

It is indicated that the index information of pre-configured resource applied for activation.

It is indicated that the number of continuous pre-configured resource applied for activation.

Third, after determining that the pre-configured resource needs to be activated by the terminal device, the base station updates the secret key according to the NCC that was configured in the suspend configuration (suspendconfig) in the context of the terminal device (i.e., the first NCC), and uses the latest key to encrypt and integrity-protect the MSG4. The MSG4 is sent to the terminal device by the base station, and the MSG4 may be the RRC release message. Before sending the MSG4, the base station requests a new NCC (i.e., the second NCC) from the access management function (AMF) for the terminal device. The AMF sends the latest NCC to the base station. The base station configures the new NCC in MSG 4, and sends the new NCC to the terminal device. In some embodiments, when performing MSG4 configuring process, the base station determines the number of the uplink pre-configured resource confirmed to be activated consecutively, and/or the duration confirmed to be activated.

Fourth, the terminal device performs to verify the integrity protection of MSG4 after receiving the MSG4.

In response to the verification passing, the pre-configured resource applied for activating is activated. Further, in response to the first timer or the first counter being configured, the terminal device starts the first timer or resets the first counter to zero.

In response to the integrity protection verification failing, the terminal device enters the idle state, and releases all the context information of the terminal device (including configuration information of the pre-configuration resource). Further, in response to the terminal device is still required for transmitting the uplink data at this time, the random access process is initiated, and the data transmission is performed after the terminal device enters the connected state.

A Second Example

For the downlink pre-configured resource, following operations are included.

First, if the small data is received by the base station, the base station detects the context of the terminal device and configures the exiting downlink pre-configured resource, and the base station initiates the activating process of the downlink pre-configured resource.

Second, the base station sends the paging message to the terminal device, and the paging message carries indication information. The indication information is configured to indicate the terminal device to initiate the activating process of the downlink pre-configured resource, and/or prepare to receive downlink small data.

Third, the terminal device selects the preamble corresponding to the small data and/or the RACH resource to initiate the random access process, and sends the RRC resume request message to the base station. In addition, the CCCH corresponding to the RRC resume request message and the small data corresponding to the DTCH are not multiplexed in the MAC layer.

Fourth, after receiving the RRC resume request message, the base station obtains the context message of the terminal device. According to the preamble corresponding to the RRC resume request message sent by the terminal device, and/or the RACH resource, the small data transmission is determined by the terminal device. Furthermore, the base station judges that the purpose of the terminal device sending the RRC resume request message is to activate the downlink pre-configured resource for the small data transmission according to a case that the CCCH corresponding to the RRC resume request message and the small data corresponding to the DTCH are not multiplexed in the MAC layer, and/or the case that the pre-configured resource is included in the context of the terminal device.

Alternatively, the terminal device carries indication information (i.e., the fourth indication information) in the RRC resume request message. Alternatively, the indication information and the CCCH corresponding to the RRC resume request message multiplex one MAC CE in the MAC layer (i.e., the indication information is carried by the MAC CE). The indication information is configured to indicate the terminal device to apply for activating the pre-configured resource. In some embodiments, the indication information is configured to indicate at least one of following cases.

It is indicated that whether the pre-configured resource applied for activation is the uplink pre-configured resource or the downlink pre-configured resource.

It is indicated that the index information of pre-configured resource applied for activation.

It is indicated that the number of continuous pre-configured resource applied for activation.

Fifth, after determining that the pre-configured resource needs to be activated by the terminal device, the base station updates the secret key according to the NCC that was configured in the suspend configuration (suspendconfig) in the context of the terminal device (i.e., the first NCC), and uses the latest key to encrypt and integrity-protect the MSG4. The MSG4 is sent to the terminal device by the base station, and the MSG4 may be the RRC release message. Before sending the MSG4, the base station requests a new NCC (i.e., the second NCC) from the access management function (AMF) for the terminal device. The AMF sends the latest NCC to the base station. The base station configures the new NCC in MSG 4, and sends the new NCC to the terminal device. In some embodiments, when performing MSG4 configuring process, the base station determines the number of the downlink pre-configured resource confirmed to be activated consecutively, and/or the duration confirmed to be activated.

Sixth, the terminal device performs to verify the integrity protection of MSG4 after receiving the MSG4.

In response to the verification passing, the pre-configured resource applied for activating is activated. Further, in response to the first timer or the first counter being configured, the terminal device starts the first timer or resets the first counter to zero.

In response to the integrity protection verification failing, the terminal device enters the idle state, and releases all the context information of the terminal device (including configuration information of the pre-configuration resource). Further, if the terminal device is still required for transmitting the uplink data at this time, the random access process is initiated, and the data transmission is performed after the terminal device enters the connected state.

A Third Example

For the downlink pre-configured resource, following operations are included.

First, if the base station reaches the small data, the base station detects the context of the terminal device and configures the exiting downlink pre-configured resource, and the base station initiates the activating process of the downlink pre-configured resource.

Second, the base station sends the paging message to the terminal device, and the paging message carries indication information. The indication information is configured to indicate the terminal device to initiate the activating process of the downlink pre-configured resource, and/or prepare to receive downlink small data.

Third, the terminal device initiates the random access process, and sends the RRC resume request message to the base station. In addition, the CCCH corresponding to the RRC resume request message and the small data corresponding to the DTCH are not multiplexed in the MAC layer.

Fourth, after receiving the RRC resume request message, the base station obtains the context message of the terminal device, and judges that the terminal device is a terminal device which the small data reaches according to an identifier of the terminal device.

Fifth, after determining that the pre-configured resource needs to be activated by the terminal device, the base station updates the secret key according to the NCC that was configured in the suspend configuration (suspendconfig) in the context of the terminal device (i.e., the first NCC), and uses the latest key to encrypt and integrity-protect the MSG4. The MSG4 is sent to the terminal device by the base station, and the MSG4 may be the RRC release message. Before sending the MSG4, the base station requests a new NCC (i.e., the second NCC) from the access management function (AMF) for the terminal device. The AMF sends the latest NCC to the base station. The base station configures the new NCC in MSG 4, and sends the new NCC to the terminal device. In some embodiments, when performing MSG4 configuring process, the base station determines the number of the downlink pre-configured resource confirmed to be activated consecutively, and/or the duration confirmed to be activated.

Sixth, the terminal device performs to verify the integrity protection of MSG4 after receiving the MSG4.

In response to the verification passing, the pre-configured resource applied for activating is activated. Further, in response to the first timer or the first counter being configured, the terminal device starts the first timer or resets the first counter to zero.

In response to the integrity protection verification failing, the terminal device enters the idle state, and releases all the context information of the terminal device (including configuration information of the pre-configuration resource). Further, if the terminal device is still required for transmitting the uplink data at this time, the random access process is initiated, and the data transmission is performed after the terminal device enters the connected state.

In an embodiment, the network device further sends signal to activate one or more pre-configuration resources. Specifically, the terminal device receives deactivation instruction sent by the network device. The deactivation instruction is configured to indicate to deactivate the pre-configuration resource. Based on the deactivation instruction, the terminal device deactivates the pre-configuration resource. Further, the deactivation instruction is carried in the MAC CE.

For example, the base station sends the MAC CE to the terminal device on the activated downlink pre-configuration resource. The MAC CE carries the deactivation instruction, and is configured to activate one or more pre-configuration resources.

In some embodiments, the MAC CE includes at least one of following information.

Header information is configured to indicate to deactivate all pre-configuration resources.

Uplink indication information is configured to indicate to deactivate all uplink pre-configured resources.

Downlink indication information is configured to indicate to deactivate all downlink pre-configured resources.

Index information of at least one of the pre-configured resources is configured to indicate to deactivate the uplink pre-configured resource or the downlink pre-configured resource.

Index list of the pre-configured resource is configured to indicate to deactivate a plurality of the uplink pre-configured resources and/or a plurality of the downlink pre-configured resources.

In an embodiment, the pre-configured resource may be automatically released when triggered by certain events. Specifically, in response to the terminal device entering the inactive state, in response to at least one of following events taking place on the terminal device, the pre-configured resource may be automatically released.

Cell reselection takes place on the terminal device.

Inter-RAT cell reselection takes place on the terminal device.

A variation of the path loss value of the terminal device exceeds a certain threshold.

A difference between the path loss value of the terminal device and the configuration value exceeds a certain threshold.

A variation of Reference Signal Receiving Power (RSR) of a measured cell of the terminal device exceeds a certain threshold.

A difference between variation of the RSR of the measured cell of the terminal device and the configuration value exceeds a certain threshold.

A mobile speed of the terminal device exceeds a certain threshold.

A mobile state of the terminal device exceeds a certain threshold.

The terminal device moves out of a first area range, and the first area range may be an effective area range of the pre-configured resource.

The terminal device enters the connected state.

Figure 3:
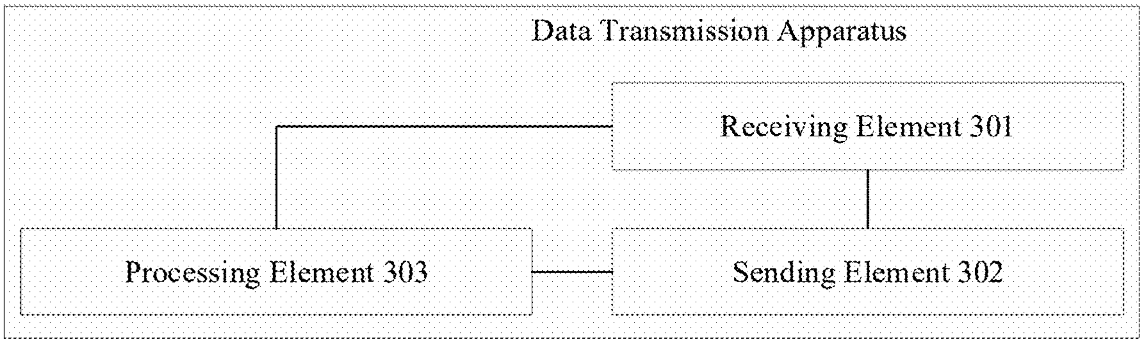
FIG. 3 is a structural schematic view of a data transmission apparatus according to some embodiments of the present disclosure.

FIG. 3 is a structural schematic view of a data transmission apparatus according to some embodiments of the present disclosure. As shown in FIG. 3, the data transmission apparatus is applied in the terminal device, and includes following elements.

A receiving element 301 is configured to receive the first configuration information sent by the network device, and the first configuration information is configured to determine the configuration information of the pre-configured resource.

A sending element 302 is configured to transmit the uplink data or receive the downlink data via the pre-configured resource, in response to the pre-configured resource being activated.

In an embodiment, the first configuration information and the suspend configuration (suspendconfig) are carried in the RRC release message. Alternatively, the first configuration information is carried in the suspend configuration, and the suspend configuration is carried in the RRC release message.

The suspend configuration is configured to determine the RRC inactive configuration parameters.

In some embodiments, the first configuration information includes at least one of the following information.

The first indication information is configured to indicate whether the initial state of the pre-configured resource is the activated state or the deactivated state.

The second indication information is configured to indicate duration of a first timer, and the first timer is configured to trigger deactivation of the pre-configured resource.

The third indication information is configured to indicate the maximum value of a first counter, and the first counter is configured to trigger deactivation of the pre-configured resource.

The resource configuration of the pre-configured resource.

In some embodiments, the resource configuration of the pre-configured resource includes at least one of: the period, the interval, the time domain resource, the frequency domain resource, the modulation and demodulation parameter, the TBS parameter.

In an embodiment, the pre-configured resource is the uplink pre-configured resource, and the data transmission apparatus further includes following elements.

A selecting element (not shown) is configured to select the random access resource corresponding to the small data to initiate random access process, in response to the small data being determined to be transmitted.

The sending element 302 is further configured to send the RRC resume request message to the network device, and the RRC resume request message is configured to apply for activating the pre-configured resource.

The receiving element 301 is further configured to receive the RRC release message sent by the network device, and perform to verify the integrity protection of the RRC release message.

A processing element 303 is configured to activate the pre-configured resource in response to the verification passing. The processing element 303 is configured to enter the idle state and release the context of the terminal device in response to the verification failing.

In an embodiment, the pre-configured resource is the downlink pre-configured resource.

The receiving element 301 is further configured to receive the paging message sent by the network device. The paging message carries the fifth indication information, and the fifth indication information is configured to indicate the terminal device to activate the pre-configured resource, and/or prepare to receive the small data through the pre-configured resource.

The data transmission apparatus further includes the selecting element, and the selecting element is configured to select the random access resource to initiate random access process, in response to the small data being determined to be transmitted.

The sending element 302 is further configured to send the RRC resume request message to the network device, and the RRC resume request message is configured to apply for activating the pre-configured resource.

The receiving element 301 is further configured to receive the RRC release message, and perform to verify the integrity protection of the RRC release message.

The data transmission apparatus further includes the processing element 303. The processing element 303 is configured to activate the pre-configured resource in response to the verification passing. The processing element 303 is configured to enter the idle state and release the context of the terminal device in response to the verification failing.

In an embodiment, after the pre-configured resource is activated, the processing element 303 is further configured to starts the first timer or resets the first counter in response to the first timer or the first counter being configured.

In an embodiment, the selecting element is configured to select the preamble corresponding to the small data and/or the RACH resource to initiate random access process.

In an embodiment, the CCCH corresponding to the RRC resume request message and the small data corresponding to the DTCH are not multiplexed in the MAC layer.

In an embodiment, after the RRC resume request message is received by the network device, the network device obtains the context message of the terminal device, and determines that the purpose of the terminal device sending the RRC resume request message is to activate the pre-configured resource for the small data transmission or reception according to at least one of following cases.

It is determined that the small data transmission is performed by the terminal device according to the random access resource, and it is determined that the purpose of the RRC resume request message is to activate the pre-configured resource for the small data transmission or reception according to a case that the transmission channel corresponding to the RRC resume request message and the transmission channel corresponding to the small data are not multiplexed to transmit in the MAC layer.

It is determined that the purpose of the RRC resume request message is to activate the pre-configured resource for the small data transmission or reception according to a case that the pre-configured resource is included in the context of the terminal device.

In an embodiment, the RRC resume request message carries fourth indication information.

Alternatively, the transmission channel corresponding to the RRC resume request message and the fourth indication information are multiplexed in the MAC CE.

The fourth indication information is configured to indicate the terminal device to apply for activating the pre-configured resource.

In some embodiments, the fourth indication information is configured to indicate at least one of following cases.

It is indicated that whether the pre-configured resource applied for activation is the uplink pre-configured resource or the downlink pre-configured resource.

It is indicated that the index information of the pre-configured resource applied for activation.

It is indicated that the number of the continuous pre-configured resource applied for activation.

The RRC release message is encrypted and integrity protected via the first secret key by the network device. The first secret key is the secret key updated based on the first NCC. The first NCC has been configured to the terminal device before the network device sends the RRC release message.

The RRC release message carries the second NCC. The second NCC is the new NCC requested by the network device from the core network for the terminal device.

In an embodiment, the RRC release message further carries the number of pre-configured resource confirmed to be activated by the network device, or the duration confirmed to be activated by the network device.

In an embodiment, after the terminal device enters the idle state, in response to determine that the small data needs to be transmitted, the sending element 302 is further configured to initiates the random access process and transmits the small data after the terminal device enters the connected state.

In an embodiment, the processing element 303 is further configured to deactivate the pre-configured resource in response to the first timer expiring after activating the preconfigured resource and starting the first timer.

In an embodiment, the duration of the first timer is configured by the network device. Alternatively, the duration of the first timer is configured by the terminal device.

In an embodiment, the processing element 303 is further configured for the following case. After the pre-configured resource is activated and the first counter is reset, and the value of the first counter is added by 1 every the pre-configured resource being used. In response to the value of the first counter being greater or equal to the maximum value of the first counter, the processing element 303 deactivates the pre-configured resource.

The receiving element 301 is further configured to receive the deactivation instruction sent by the network device. The deactivation instruction is configured to indicate to deactivate the pre-configuration resource.

The data transmission apparatus further includes the processing element 303. The processing element 303 is configured to deactivate the pre-configuration resource based on the deactivation instruction.

In an embodiment, the deactivation instruction is carried in the MAC CE. The MAC CE includes at least one of following information.

The header information is configured to indicate to deactivate all pre-configuration resources.

The uplink indication information is configured to indicate to deactivate all uplink pre-configured resources.

The downlink indication information is configured to indicate to deactivate all downlink pre-configured resources.

The index information of at least one of the pre-configured resources is configured to indicate to deactivate the uplink pre-configured resource or the downlink pre-configured resource.

The index list of the pre-configured resource is configured to indicate to deactivate the plurality of the uplink pre-configured resources and/or the plurality of the downlink pre-configured resources.

In an embodiment, the data transmission apparatus further includes the processing element 303.

The processing element 303 is configured to automatically release the pre-configured resource in the case that if at least one of the following events takes place on the terminal device in response to the terminal device entering the inactive state.

The cell reselection takes place on the terminal device.

The inter-RAT cell reselection takes place on the terminal device.

The variation of the path loss value of the terminal device exceeds the certain threshold.

The difference between the path loss value of the terminal device and the configuration value exceeds the certain threshold.

The variation of the RSR of the measured cell of the terminal device exceeds the certain threshold.

The difference between variation of the RSR of the measured cell of the terminal device and the configuration value exceeds the certain threshold.

The mobile speed of the terminal device exceeds the certain threshold.

The mobile state of the terminal device exceeds the certain threshold.

The terminal device moves out of the first area range, and the first area range may be the effective area range of the pre-configured resource.

The terminal device enters the connected state.

It should be considered by those skilled in the art that the relevant description of the above-mentioned data transmission apparatus may refer to the relevant description of the data transmission method in the embodiments of the present disclosure to understand.

Figure 4:
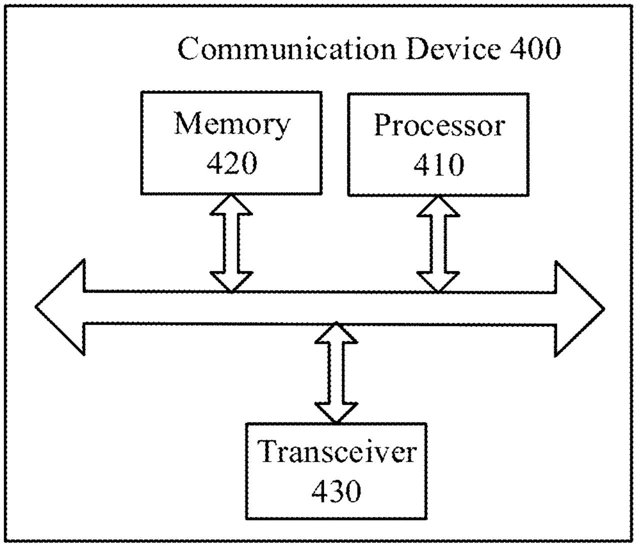
FIG. 4 is a structural schematic view of a communication device according to some embodiments of the present disclosure.

FIG. 4 is a structural schematic view of a communication device 400 according to some embodiments of the present disclosure. The communication device may be the terminal device, or the network device. The communication device 400 as shown in FIG. 4 includes a processor 410. The processor 410 may call from a memory and run a computer program to execute the method in the embodiments of the present disclosure.

In some embodiments, as shown in FIG. 4, the communication device 400 may further include a memory 420. The processor 410 may call from the memory 420 and run the computer program to execute the method in embodiments of the present disclosure.

The memory 420 may be a separate device from the processor 410 or may be integrated into the processor 410.

In some embodiments, as shown in FIG. 4, the communication device 400 may further include a transceiver 430. The processor 410 may control the transceiver 430 to communicate with other devices. Specifically, the transceiver 430 is controlled to send information or data to the other devices, or to receive information or data sent by the other devices.

The transceiver 430 may include a transmitter and a receiver. The transceiver 430 may further include an antenna, and the number of antennas may be one or more.

In some embodiments, the communication device 400 may specifically be the network device of the embodiments of the present disclosure, and the communication device 400 may execute the corresponding processes executed by the network device in various methods of the embodiments of the present disclosure, which will not be repeated herein for brevity.

In some embodiments, the communication device 400 may be a mobile terminal or the terminal device of the embodiments of the present disclosure, and the communication device 400 may execute the corresponding processes executed by the mobile terminal or the terminal device in the various methods of the embodiments of the present disclosure, which will not be repeated herein for brevity.

Figure 5:
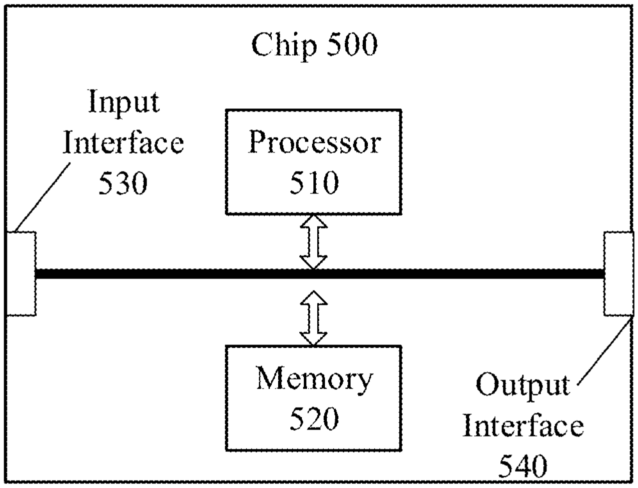
FIG. 5 is a structural schematic view of a chip according to some embodiments of the present disclosure.

FIG. 5 is a structural schematic view of a chip according to some embodiments of the present disclosure. As shown in FIG. 5, the chip 500 includes a processor 510. The processor 510 may call from a memory and run a computer program to execute the method in the embodiments of the present disclosure.

In some embodiments, as shown in FIG. 5, the chip 500 may further include a memory 520. The processor 510 may call from the memory 520 and run the computer program to execute the method in embodiments of the present disclosure.

The memory 520 may be a separate device from the processor 510 or may be integrated in the processor 510.

In some embodiments, the chip 500 may further include an input interface 530. The processor 510 may control the input interface 530 to communicate with other devices or chips. Specifically, the input interface 530 is controlled to obtain information or data sent by the other devices or chips.

In some embodiments, the chip 500 may further include an output interface 540. The processor 510 may control the output interface 540 to communicate with other devices or chips. Specifically, the output interface 540 is controlled to output information or data to the other devices or chips.

In some embodiments, the chip may be applied to the network device in embodiments of the present disclosure, and the chip may execute the corresponding processes executed by the network device in the various methods of embodiments of the present disclosure, which will not be repeated herein for brevity.

In some embodiments, the chip may be applied to the mobile terminal or the terminal device in the embodiments of the present disclosure, and the device may execute the corresponding processes executed by the mobile terminal or the terminal device in the various methods of the embodiments of the present disclosure, which will not be described herein for brevity.

In some embodiments, the chip referred to in embodiments of the present disclosure may also be referred to a system-level chip, system chip, chip system or system-on chip, etc.

Figure 6:
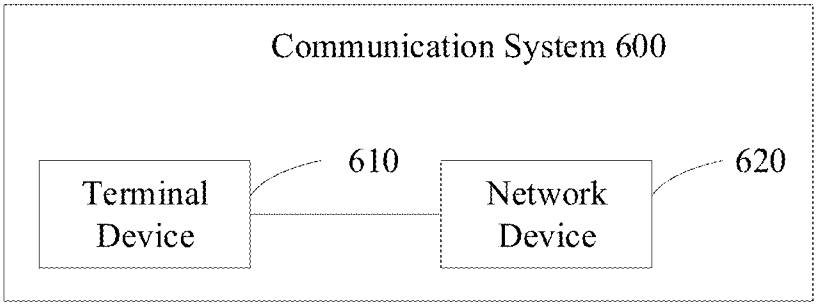
FIG. 6 is a schematic block view of a communication system according to some embodiments of the present disclosure.

FIG. 6 is a schematic block view of a communication system 600 according to some embodiments of the present disclosure. As shown in FIG. 6, the communication system 600 includes a terminal device 610 and a network device 620.

The terminal device 610 may be configured to execute the corresponding functions executed by the terminal device in the above-mentioned method, and the network device 620 may be configured to execute the corresponding functions executed by the network device in the above-mentioned method, which will not be described herein for brevity.

It should be understood that the processor of the embodiments of the present disclosure may be an integrated circuit chip having the processing capability of signals. In the process of implementation, the steps of the above method embodiments may be accomplished by integrated logic circuitry in the hardware of the processor or instructions in the form of software. The above processor may be a general-purpose processor, a digital signal processor (DSP), an application specific integrated circuit (ASIC), a field programmable gate array (FPGA) or other programmable logic device, discrete gate or transistor logic device, or discrete hardware component. The respective methods, steps, and logic block diagrams in the embodiments of the present disclosure may be executed or performed. The general-purpose processor may be a microprocessor or the processor may also be any conventional processor, etc. The steps of the method disclosed in conjunction with the embodiments of the present disclosure may be directly embodied as performed by the hardware decode processor or performed with a combination of hardware and software modules in the decode processor. The software module may be in random memory, flash memory, read-only memory, programmable read-only memory or electrically rewritable programmable memory, registers, and other storage medium well established in the art. The storage medium is in the memory and the processor reads information in the memory and completes the steps of the above method in combination with the hardware.

It should be understood that the memory in embodiments of the present disclosure may be volatile memory or non-volatile memory, or may include both volatile and non-volatile memory. The non-volatile memory may be read-only memory (ROM), programmable ROM (PROM), erasable PROM (EPROM), electrically EPROM (EEPROM), or flash memory. The volatile memory may be random access memory (RAM), which is used as an external cache. By way of illustration, but not limitation, many forms of RAM are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM), and direct Rambus RAM (DR RAM). It should be noted that the memory of the systems and methods described herein are intended to include, but are not limited to, these and any other suitable types of memories.

It should be understood that the above-mentioned memories are exemplary but not limiting descriptions, for example, the memory in the embodiments of the present disclosure may also be static RAM (SRAM), dynamic RAM (DRAM), synchronous DRAM (SDRAM), double data rate SDRAM (DDR SDRAM), enhanced SDRAM (ESDRAM), synchronous link DRAM (SLDRAM), and direct Rambus RAM (DR RAM), etc. That is, the memory in the embodiments of the present disclosure is intended to include, but is not limited to, these and any other suitable types of memories.

Embodiments of the present disclosure further provide a computer-readable storage medium, which is configured to store a computer program.

In some embodiments, the computer-readable storage medium may be applied to the network device in the embodiments of the present disclosure, and the computer program causes the computer to execute the corresponding processes executed by the network device in the various methods of embodiments of the present disclosure, which will not be described herein for brevity.

In some embodiments, the computer-readable storage medium may be applied to the mobile terminal or the terminal device in the embodiments of the present disclosure, and the computer program causes the computer to execute the corresponding processes executed by the mobile terminal/terminal device in the various methods of the embodiments of the present disclosure, which will not be repeated herein for the sake of brevity.

Embodiments of the present disclosure further provide a computer program product including computer program instructions.

In some embodiments, the computer program product may be applied to the network device in the embodiments of the present disclosure, and the computer program instructions cause the computer to execute the corresponding processes executed by the network device in the respective methods of the embodiments of the present disclosure, which will not be repeated herein for brevity.

In some embodiments, the computer program product may be applied to the mobile terminal or the terminal device in the embodiments of the present disclosure, and the computer program instructions cause the computer to execute the corresponding processes executed by the mobile terminal/terminal device in the respective methods of the embodiments of the present disclosure, which will not be repeated herein for the sake of brevity.

Embodiments of the present disclosure further provide a computer program.

In some embodiments, the computer program may be applied to the network device in the embodiments of the present disclosure, and when the computer program is executed on the computer, the computer program causes the computer to perform the corresponding processes executed by the network device in the respective methods of the embodiments of the present disclosure, which will not be repeated herein for brevity.

In some embodiments, the computer program may be applied to the mobile terminal or the terminal device in the embodiments of the present disclosure, and when the computer program is executed on the computer, the computer program causes the computer to perform the corresponding processes executed by the mobile terminal or the terminal device in the various methods of the embodiments of the present disclosure, which will not be repeated herein for brevity.

Those skilled in the art may realize that the elements and algorithmic steps of each example described in conjunction with the embodiments disclosed herein may be executed as electronic hardware, or a combination of computer software and electronic hardware. Whether these functions are performed by manners of hardware or software depends on particular applications and design constraints of the technical solution. Those skilled in the art may use different methods to execute the described functions for each particular application, but such implementations should not be considered outside the scope of the present disclosure.

It will be clear to those skilled in the art that for the convenience and brevity of the description, the specific working processes of the systems, devices and elements described above may be referred to the corresponding processes in the preceding method embodiments, which is not be repeated herein.

In several embodiments provided by the present disclosure, it should be understood that the disclosed systems, apparatus, and methods, may be executed in other ways. For example, the embodiments of the apparatus described above are merely schematic, for example, the division of the elements described, which is only a logical functional division, may be divided in other ways when executed; for example, multiple elements or components may be combined or integrated into another system, or some features may be ignored, or not executed. In addition, the mutual coupling or direct coupling or communication connections shown or discussed may be indirect coupling or communication connections through some interfaces, apparatus or element, which may be electrical, mechanical, or other forms.

The elements illustrated as separate components may or may not be physically separated, and components shown as elements may or may not be physical elements, i.e., they may be located in one place or may be distributed to a plurality of network elements. Some or all of these elements may be selected according to practical needs to achieve the purpose of the present disclosure.

In addition, each functional element in each embodiment of the present disclosure may be integrated in a single processing element, or each element may be physically present separately, or two or more elements may be integrated in a single element.

The functions, when executed as a software functional element and sold or used as a separate product, may be stored in a computer-readable storage medium. It should be understood that the technical solution of the present disclosure, or that part of the technical solution that essentially contributes to the prior art, may be embodied in the form of a software product that is stored in a storage medium and includes a number of instructions to cause a computer device (which may be a personal computer, server, or network device, etc.) to perform all or some of the steps of the method described in various embodiments of the present disclosure. The storage medium includes USB flash drive, removable hard disk, read-only memory (ROM), random access memory (RAM), disk or CD-ROM, and other medium that may store program code.

The foregoing is only a specific implementation of the present disclosure, but the scope of the present disclosure is not limited thereto, and any changes or substitutions that can be readily thought of by those skilled in the art within the scope of the technology disclosed in the present disclosure shall be covered by the scope of the present disclosure. Therefore, the scope of the present disclosure shall be stated to be subject to the scope of the claims.

What is claimed is:

1. A data transmission method, comprising:

receiving, by a terminal device, first configuration information, sent by a network device, wherein the first configuration information is configured to determine configuration information of pre-configured resource; and in response to the pre-configured resource being activated, transmitting uplink data or receiving downlink data via the pre-configured resource by the terminal device;

wherein in response to the pre-configured resource being uplink pre-configured resource, the data transmission method further comprises:

in response to the terminal device determining that small data needs to be transmitted, selecting random access resource corresponding to the small data to initiate random access process, and sending an RRC resume request message, configured to apply for activating the pre-configured resource, to the network device; and receiving, by the terminal device, an RRC release message sent by the network device, and performing integrity protection verification for the RRC release message;

wherein in response to the verification passing, the pre-configured resource is activated by the terminal device; and in response to the verification failing, the terminal device enters an idle state, and context of the terminal device is released by the terminal device.

2. The method according to claim 1, wherein the first configuration information and suspend configuration are carried in radio resource control (RRC) releasing message; or the first configuration information is carried in the suspend configuration, and the suspend configuration is carried in the RRC releasing message;

wherein the suspend configuration is configured to determine an RRC inactive configuration parameter.

3. The method according to claim 1, wherein the first configuration information comprises at least one of:

first indication information, configured to indicate whether an initial state of the pre-configured resource is an activated state or a deactivated state;

second indication information, configured to indicate a duration of a first timer, wherein the first timer is configured to trigger deactivation of the pre-configured resource;

third indication information, configured to indicate a maximum value of a first counter, and the first counter is configured to trigger deactivation of the pre-configured resource; and resource configuration of the pre-configured resource.

4. The method according to claim 3, wherein the resource configuration of the pre-configured resource comprises at least one of: period, interval, time domain resource, frequency domain resource, a modulation and demodulation parameter, and a transport block size (TBS) parameter.

5. The method according to claim 1, wherein the selecting random access resource to initiate random access process further comprises:

selecting a preamble corresponding to the small data and/or a random access channel (RACH) resource to initiate the random access process.

6. The method according to claim 1, wherein after receiving the RRC resume request message, the network device obtains the context of the terminal device and determines that purpose of the terminal device sending the RRC resume request message is to activate the pre-configured resource for the small data transmission and reception according to at least one of:

determining that the small data transmission is performed by the terminal device according to the random access resource, and determining that the purpose of the RRC resume request message is to activate the pre-configured resource for the small data transmission according to a case that a transmission channel corresponding to the RRC resume request message and a transmission channel corresponding to the small data are not multiplexed to transmit in a MAC layer; and determining that the purpose of the RRC resume request message is to activate the pre-configured resource for the small data transmission according to a case that the pre-configured resource is included in the context of the terminal device.

7. The method according to claim 1, wherein:

the RRC resume request message carries fourth indication information; or a transmission channel corresponding to the RRC resume request message and the fourth indication information are multiplexed in a media access control control element (MAC CE).

8. The method according to claim 1, wherein the RRC release message is encrypted and integrity protected via a first secret key by the network device, the first secret key is a secret key updated based on a first NCC, and the first NCC has been configured to the terminal device before the network device sends the RRC release message; and the RRC release message carries a second NCC, and the second NCC is a new NCC requested by the network device from a core network for the terminal device.

9. The method according to claim 1, further comprising:

after the terminal device activating the pre-configured resource and resetting a first counter, adding a value of the first counter by 1 every the pre-configured resource being used; and in response to the value of the first counter being greater or equal to a maximum value of the first counter, deactivating the pre-configured resource by the terminal device.

10. A terminal device, comprising: a memory and a processor; wherein the memory is configured to store a computer program, and the processor is configured to call and run the computer program stored in the memory to cause the terminal device to perform operations comprising:

receiving first configuration information, sent by a network device, wherein the first configuration information is configured to determine configuration information of pre-configured resource;

in response to the pre-configured resource being activated, transmitting uplink data or receiving downlink data via the pre-configured resource;

wherein in response to the pre-configured resource being uplink pre-configured resource, the processor is configured to call and run the computer program stored in the memory to cause the terminal device to perform operations comprising:

in response to the terminal device determining that small data needs to be transmitted, selecting random access resource corresponding to the small data to initiate random access process, and sending an RRC resume request message, configured to apply for activating the pre-configured resource, to the network device; and receiving an RRC release message sent by the network device, and performing integrity protection verification for the RRC release message;

wherein in response to the verification passing, the pre-configured resource is activated by the terminal device; and in response to the verification failing, the terminal device enters an idle state, and context of the terminal device is released by the terminal device.

11. The terminal device according to claim 10, wherein the first configuration information and suspend configuration are carried in radio resource control (RRC) releasing message; or the first configuration information is carried in the suspend configuration, and the suspend configuration is carried in the RRC releasing message;

wherein the suspend configuration is configured to determine an RRC inactive configuration parameter.

12. The terminal device according to claim 10, wherein the first configuration information comprises at least one of:

first indication information, configured to indicate whether an initial state of the pre-configured resource is an activated state or a deactivated state;

second indication information, configured to indicate a duration of a first timer, wherein the first timer is configured to trigger deactivation of the pre-configured resource;

third indication information, configured to indicate a maximum value of a first counter, and the first counter is configured to trigger deactivation of the pre-configured resource; and resource configuration of the pre-configured resource.

13. The terminal device according to claim 12, wherein the resource configuration of the pre-configured resource comprises at least one of: period, interval, time domain resource, frequency domain resource, a modulation and demodulation parameter, and a transport block size (TBS) parameter.

14. The method according to claim 1, further comprising:

after the pre-configured resource being activated by the terminal device, in response to a first timer or a first counter being configured, starting the first timer or resetting the first counter.

15. The method according to claim 1, further comprising:

in response to the terminal device entering an inactive state, automatically releasing the pre-configured resource if at least one of following events taking place on the terminal device:

cell reselection taking place on the terminal device;

inter-RAT cell reselection taking place on the terminal device;

a variation of a path loss value of the terminal device exceeding a certain threshold;

a difference between the path loss value of the terminal device and a configuration value exceeding a certain threshold;

a variation of reference signal receiving power (RSRP) of a measured cell of the terminal device exceeding a certain threshold;

a difference between variation of the RSRP of the measured cell of the terminal device and the configuration value exceeding a certain threshold;

a mobile speed of the terminal device exceeding a certain threshold;

a mobile state of the terminal device exceeding a certain threshold;

the terminal device moving out of a first area range, and the first area range being an effective area range of the pre-configured resource; and the terminal device entering a connected state.

16. The terminal device according to claim 10, wherein the processor is configured to call and run the computer program stored in the memory to cause the terminal device to further perform an operation of:

after the pre-configured resource being activated by the terminal device, in response to a first timer or a first counter being configured, starting the first timer or resetting the first counter.

17. The terminal device according to claim 10, wherein the processor is configured to call and run the computer program stored in the memory to cause the terminal device to further perform an operation of:

in response to the terminal device entering an inactive state, automatically releasing the pre-configured resource if at least one of following events taking place on the terminal device:

cell reselection taking place on the terminal device;

inter-RAT cell reselection taking place on the terminal device;

a variation of a path loss value of the terminal device exceeding a certain threshold;

a difference between the path loss value of the terminal device and a configuration value exceeding a certain threshold;

a variation of reference signal receiving power (RSRP) of a measured cell of the terminal device exceeding a certain threshold;

a difference between variation of the RSRP of the measured cell of the terminal device and the configuration value exceeding a certain threshold;

a mobile speed of the terminal device exceeding a certain threshold;

a mobile state of the terminal device exceeding a certain threshold;

the terminal device moving out of a first area range, and the first area range being an effective area range of the pre-configured resource; and the terminal device entering a connected state.

18. A terminal device, comprising:

a memory and a processor; wherein the memory is configured to store a computer program, and the processor is configured to call and run the computer program stored in the memory to cause the terminal device to perform operations comprising:

receiving first configuration information, sent by a network device, wherein the first configuration information is configured to determine configuration information of pre-configured resource;

in response to the pre-configured resource being activated, transmitting uplink data or receiving downlink data via the pre-configured resource;

wherein in response to the pre-configured resource being downlink pre-configured resource, the processor is configured to call and run the computer program stored in the memory to cause the terminal device to perform operations comprising:

receiving a paging message sent by the network device, wherein the paging message carries fifth indication information, and the fifth indication information is configured to indicate the terminal device to activate the pre-configured resource and prepare to receive the small data through the pre-configured resource;

in response to the terminal device determining that small data needs to be transmitted, selecting random access resource to initiate random access process, and sending an RRC resume request message, configured to apply for activating the pre-configured resource, to the network device; and receiving an RRC release message sent by the network device, and performing integrity protection verification for the RRC release message;

wherein in response to the verification passing, the pre-configured resource is activated by the terminal device; and in response to the verification failing, the terminal device enters an idle state, and context of the terminal device is released by the terminal device.

19. The terminal device according to claim 18, wherein:

the first configuration information and suspend configuration are carried in radio resource control (RRC) releasing message; or the first configuration information is carried in the suspend configuration, and the suspend configuration is carried in the RRC releasing message;

wherein the suspend configuration is configured to determine an RRC inactive configuration parameter.

20. The terminal device according to claim 18, wherein the first configuration information comprises at least one of:

first indication information, configured to indicate whether an initial state of the pre-configured resource is an activated state or a deactivated state;

second indication information, configured to indicate a duration of a first timer, wherein the first timer is configured to trigger deactivation of the pre-configured resource;

third indication information, configured to indicate a maximum value of a first counter, and the first counter is configured to trigger deactivation of the pre-configured resource; and resource configuration of the pre-configured resource.

* * * * *